July 15, 1969   H. SCHLEER   3,454,995
BUCKLE FOR SAFETY BELTS
Filed May 17, 1967
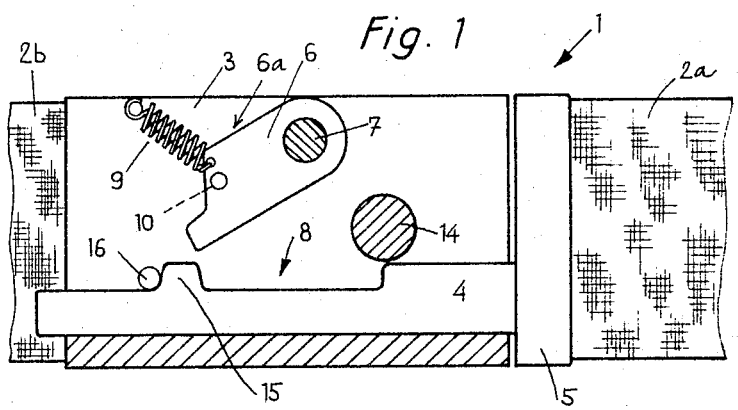
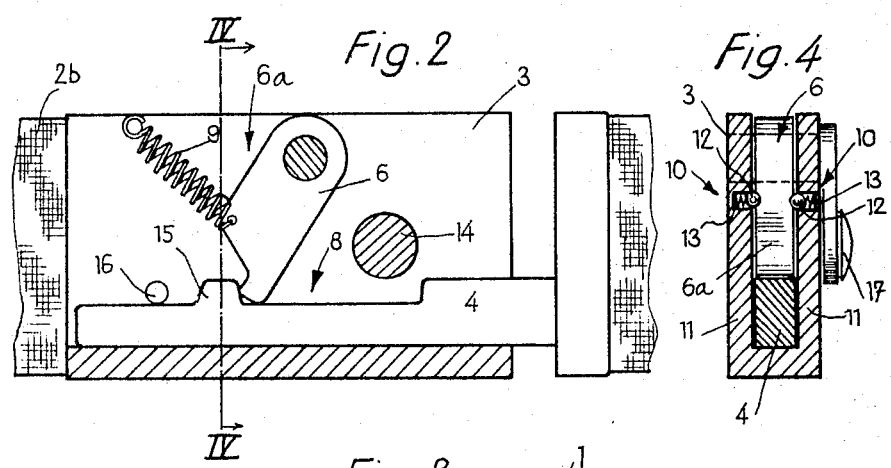
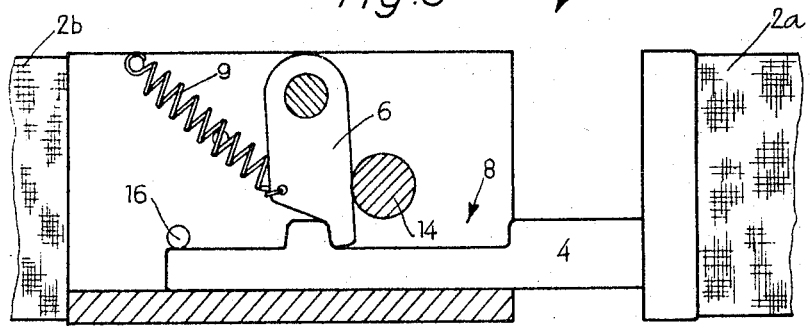
INVENTOR:
HILMAR SCHLEER
by Jacob L. Kollin
ATTORNEY

United States Patent Office

3,454,995
Patented July 15, 1969

3,454,995
BUCKLE FOR SAFETY BELTS
Hilmar Schleer, 19 Dreikonigstrasse,
Freiburg, Germany
Filed May 17, 1967, Ser. No. 639,164
Int. Cl. A44b 19/00; B60r 21/10
U.S. Cl. 24—230                                  3 Claims

ABSTRACT OF THE DISCLOSURE

A buckle for safety belts comprising a housing member for attaching to one end of a safety belt and a locking bolt for attaching to another end of a safety belt. The bolt is insertable in the housing member and has a protruding nose. A locking pawl in the housing is engageable with the nose. A tension spring in the housing biases the pawl into an unlocking position. Spring means are provided to bias the pawl in locked position against the spring's tension when the bolt is in locked position. A manual lever secured to the pawl moves it into a locked or unlocking position.

---

Buckles for safety belts are already known in the art. These buckles are, however, disadvantageous in many ways.

It is the object of the present invention to provide a buckle for safety belts which overcomes these disadvantages, is of simple construction, reliable in its function and easy to handle.

This object is attained according to the present invention by the provision of a buckle for safety belts which comprises two members each of which is attached to one free end of two safety belt portions to be connected; a housing formed by one of the said two members; a locking bolt formed on the other member and removably insertable in said housing; a nose protruding from said locking bolt intermediate the ends thereof; a locking pawl pivotable in said housing about a pin and adapted to move from a first extreme end position, i.e. the unlocking position, via a normal locking position, in which it engages behind the nose on the locking bolt, into a second extreme end position, i.e. that locking position in which the safety belt is locked under maximum tensile stress; a tension spring connected at its ends to the housing and the locking pawl for pulling the latter into its unlocking position; means for automatically separating the two buckle members; a stop traversing the housing and limiting the swing of said locking pawl in its second extreme end position; i.e. the locking position, and a pair of spring-loaded stops adjusted to the force of the tension spring so as to induce said tension spring to pivot said locking pawl directly from the second extreme end position, i.e. the locking position, via the normal locking position into the first extreme end position, i.e. the unlocking position.

Preferably, the housing of the buckle is provided with a stop pin against which the nose on the locking bolt abuts when the latter is inserted in the housing.

Another advantage can be obtained if adjustable compression springs serve to keep said pair of stops in their engaging positions, an adjusting lever being associated with the pair of stops upon the actuation of which the pair of stops will be inactive.

Expediently the forces exerted by the tension spring and the spring-loaded stops on to the locking pawl are adjustable by means of adjusting means known per se.

In order to facilitate handling, the locking pawl may be connected to an adjusting lever through the intermediary of a reduction gear.

One embodiment of the invention will now be described by way of example and with reference to the accompanying drawing, in which:

FIGS. 1 to 3 are vertical longitudinal sections through a buckle for safety belts according to the invention, FIG. 1 showing the buckle in unlocked position, FIG. 2 in locked position and FIG. 3 in loaded position, and FIG. 4 is a vertical cross section on the line IV—IV of FIG. 2.

FIGS. 1 to 4 show a buckle 1 for a safety belt consisting of a housing 3 and a locking bolt 4 adapted to be inserted in said housing 3. The locking bolt 4 is connected to one end 2a of the safety belt by means of a strip member 5. A locking pawl 6 is pivotaly mounted in the housing 3 by means of a pin 7 so as to be pivotable both outside and inside the region of a recess 8 in the locking bolt 4. In one of the extreme end positions shown in FIG. 1 the locking pawl 6 is outside the region of the recess 8 in the locking bolt 4. In its normal locking position shown in FIG. 2 and in its other extreme end position, i.e. the locking position shown in FIG. 3, the locking pawl 6 is within the region of said recess 8 in the locking bolt 4.

A tension spring 9 is connected at its ends to the housing and the locking pawl 6 and tends to pull the latter out of the recess 8 in the locking bolt 4. Moreover, the housing 3 is provided with a pair of spring-loaded stops 10 which hold the locking pawl 6 against the resistance of the tension spring 9 in the region of the recess 8 when the locking pawl 6 is in its normal locking position shown in FIG. 2, the stops 10 being able to engage one of the longitudinal side faces 6a of the locking pawl 6.

As shown in FIG. 4 the stops 10 consist of balls 12 embedded and guided in the side walls 11 of the housing 3 and forced towards the interior of the housing 3 by adjustable compression springs 13. The compression springs 13 are adjustable by adjusting means known per se which, for the sake of clearness, are not shown in the drawing. The invention further provides a stop 14 in the housing 3 against which the locking pawl 6 may rest when the buckle 1 is under maximum load, thereby defining, as can be seen from FIG. 3, one extreme end position of both the locking pawl 6 and the locking bolt 4, the latter being blocked by the first.

In its leading end portion, seen in the push in direction of the locking bolt 4, the recess 8 is limited by a nose 15. In front of this nose 15 there is a stop pin 16 fixed to the housing 3, said stop pin 16 and the housing 3 guiding the locking bolt 4. The locking bolt 4 may also be guided by other guide strips arranged in the strip member 5, whereas the strip member 5 itself may serve as a stop when the locking bolt 4 is inserted in the housing 3.

The locking pawl 6 is adjustable by means of an adjusting lever 17 (FIG. 4) which through the intermediary of a reduction gear (not shown) may act upon the pin 7 so as to prevent the locking pawl 6 on the pin 7 from rotation.

The buckle for safety belts as proposed by the present invention works as follows:

The locking bolt 4 connected to the end 2a of the safety belt is inserted in the housing 3 attached to the end 2b of the safety belt until the nose 15 abuts against the stop pin 16. Then the adjusting lever 17 is turned in such a manner that the locking pawl 6 is moved into the region of the recess 8 in the locking bolt 4, as shown in FIG. 2. In doing so the stops 10 are released and bear against the longitudinal side face 6a of the locking pawl 6 so as to prevent the tension spring 9 from pulling the locking pawl 6 out of the region of the recess 8. The safety belt is now closed and ready for service. For unlocking the buckle 1, without an accident having occurred, the adjusting lever 17 is returned into its opening position so that the locking pawl 6 sets free the nose 15 of the locking bolt 4. The arrangement might possibly be such that the stops 10 setting free the locking pawl 6 are directly connected with the adjusting lever 17.

If the speed of the vehicle is rapidly reduced, e.g. due to sudden braking or the like, which might cause a passenger using the safety belt to be thrown off his seat in a dangerous manner, the locked buckle 1 will expand against the resistance of the tension spring 9 into the position shown in FIG. 3. At the same time the locking pawl 6 abuts against the stop 14 thereby preventing the housing 3 and the locking bolt 4 from disengaging. After the vehicle has come to a standstill and no further accelerative forces act upon the passenger using the belt, the tension spring 9 pulls the locking bolt 4 into its unlocking position shown in FIG. 1. From its rearward position shown in FIG. 3 the locking pawl 6 may be accelerated by the tension spring 9 to such an extent that it overcomes the resistance of the stops 10 and thereby sets free the locking bolt 4 automatically. In order to ensure that the aforedescribed operation proceeds as contemplated it is necessary to exactly coordinate the resistance of the tension spring 9 and the maximum locking strength of the stops 10. In doing so the speeds of the individual vehicles coming into question and possibly also the weight of the passenger using the safety belt may likewise be taken into consideration. For this purpose adjusting means which are known per se are provided for the forces caused by the tension spring 9 and the adjustable compression springs 13, respectively, said adjusting means being not shown in the drawing for the sake of clearness. The tension spring 9 is so dimensioned and adjusted that slight decelerations of the vehicle speed causing the passenger to be slightly lifted off his seat will act upon the locking pawl 6 only to such an extent that the same remains within such a small angle of swing that, owing to the resistance exerted by the stops 10, it cannot be drawn back by the tension spring 9 into its unlocking position. The fact that the locking pawl 6 is capable of yielding is also beneficial to the passenger when the locking pawl 6 has been drawn up to the stop 14 by the accelerative forces acting upon the safety belt 2. In this case the tension spring 9 ensures that the passenger is caught in the safety belt most tenderly.

In order to permit of the locking pawl 6 being easily adjusted possibly also against a stronger resistance of the tension spring 9, the buckle 1 may be provided with a reduction gear between the adjusting lever 17 and the pin 7 carrying the locking pawl 6. Thereby the adjusting lever 17 may be adjusted through a relatively long path of rotation by using comparatively slight forces, thereby to move the locking pawl 6 through a small angle into the recess 8 in the locking bolt 4.

It may be mentioned that the retraction movement of the locking pawl 6 up to the stop 14 and the subsequent return movement of the locking pawl 6 into its unlocking position causes a certain period of time to lapse between the first heavy impact in an accident and the disengagement of the ends 2a and 2b of the safety belt caused by the automatic unlocking of the buckle. This is advantageous when the vehicle is halted at successive intervals by several obstacles.

The stop 14 reliably prevents the locked buckle from unlocking unintentionally when the tensile stress in the safety belt is strongest. If the stop 14 is given elasticity, this stop 14, too, develops forces which induce the locking pawl 6 to move toward its unlocking position. In such a case very strong elastic forces are to be accommodated in a small space. This arrangement has the advantage that two different kinds of springs—13 and 9—are available which permit of an easy adjustment of that load which causes the buckle 1 to unlock.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A buckle for safety belts comprising a housing member for attaching to one end of a safety belt and having a pair of parallel spaced walls, a locking bolt for attaching to another end of a safety belt and removably insertable and slidable in said housing member, said bolt having a nose protruding intermediate the ends thereof, a pivotable pin in said housing, a locking pawl secured to said pivotable pin and adapted to move from an unlocking position into engagement with said nose into a locked position, a tension spring secured with its ends to the housing and said locking pawl, respectively, for biasing said pawl into an unlocking position, a first stop secured in said housing in the path of travel of said locking pawl for limiting the movement of said locking pawl when said pawl is in locked position, spring means in said housing for releasably latching said locking pawl against said tension spring for holding said locking pawl in locked position, a second stop secured in said housing for limiting the travel of said nose by being engageable therewith when the latter is inserted in said housing member and is in an unlocking position and manual means for pivoting said pawl.

2. A buckle as claimed in claim 1, said spring means for releasably latching said locking pawl against said tension spring consisting of a pair of balls extending partially through said walls inwardly of said housing and a pair of springs biasing said balls.

3. A buckle as claimed in claim 1, wherein said manual means for pivoting is a lever.

References Cited

UNITED STATES PATENTS

| 2,863,200 | 12/1958 | Miller. |
| 2,864,361 | 12/1958 | Johnson. |
| 3,238,587 | 3/1966 | Goinard. |
| 3,241,205 | 3/1966 | Genin. |

FOREIGN PATENTS

| 1,315,413 | 12/1962 | France. |

BARNARD A. GELAK, Primary Examiner

U.S. Cl. X.R.

297—385